United States Patent
Von Broembsen et al.

(10) Patent No.: US 8,940,158 B2
(45) Date of Patent: Jan. 27, 2015

(54) SYSTEM AND METHOD FOR CHLORINE GENERATION AND DISTRIBUTION

(75) Inventors: David Von Broembsen, Atlanta, GA (US); Chris Warwick, Buford, GA (US); Michael Podolak, Duluth, GA (US)

(73) Assignee: ChlorKing, Inc., Norcross, GA (US)

( * ) Notice: Subject to any disclaimer, the term of this patent is extended or adjusted under 35 U.S.C. 154(b) by 853 days.

(21) Appl. No.: 12/704,686

(22) Filed: Feb. 12, 2010

(65) Prior Publication Data
US 2010/0206788 A1     Aug. 19, 2010

Related U.S. Application Data

(60) Provisional application No. 61/152,654, filed on Feb. 13, 2009.

(51) Int. Cl.
*C02F 1/76*     (2006.01)
*C02F 1/467*    (2006.01)
*C02F 103/42*   (2006.01)

(52) U.S. Cl.
CPC ..... *C02F 1/4672* (2013.01); *C02F 2201/46155* (2013.01); *C02F 2201/4618* (2013.01); *C02F 2201/4612* (2013.01); *C02F 1/4674* (2013.01); *C02F 2103/42* (2013.01); *C02F 2209/05* (2013.01); *C02F 2209/06* (2013.01)
USPC .......... 210/96.1; 210/104; 210/105; 210/177; 210/192; 210/195.1; 210/167.11; 204/269; 204/237; 204/239; 204/228.6; 204/275.1; 205/620

(58) Field of Classification Search
None
See application file for complete search history.

(56) References Cited

U.S. PATENT DOCUMENTS

| | | | |
|---|---|---|---|
| 4,767,511 A * | 8/1988 | Aragon | 210/743 |
| 6,627,053 B2 * | 9/2003 | Hirota et al. | 204/228.1 |
| 2006/0272951 A1 * | 12/2006 | Schmergel et al. | 205/291 |
| 2007/0034567 A1 * | 2/2007 | Iseki et al. | 210/631 |
| 2009/0000944 A1 * | 1/2009 | Varcoe | 204/230.6 |

* cited by examiner

Primary Examiner — Terry Cecil
(74) Attorney, Agent, or Firm — Baker & Hostetler LLP

(57) ABSTRACT

A system and method is disclosed for chlorine generation and distribution for the treatment of a pool, spa, body of water, or other water system.

20 Claims, 2 Drawing Sheets

US 8,940,158 B2

SYSTEM AND METHOD FOR CHLORINE GENERATION AND DISTRIBUTION

CROSS-REFERENCE TO RELATED APPLICATION

This application claims priority under 35 U.S.C §119(e) to U.S. provisional application Ser. No. 61/152,654, filed on Feb. 13, 2009, entitled "System and Method for Chlorine Generation and Distribution," which is herein incorporated by reference in its entirety.

TECHNICAL FIELD

The present disclosure relates generally to water treatment, and, more particularly, to on-site chlorine generation for water treatment.

BACKGROUND

As is well-known, many bodies of water need to be sanitized for use in association with human consumption or recreational activities. For example, in bodies of water such as swimming pools, spas, and the like, and in potable water storage and supply systems, food processing and cleaning systems, food handling equipment and systems, and the like, the water must be chlorinated to prevent the accumulation of algae and bacteria, the transfer of disease, or the like. Heretofore, such sanitization has been accomplished by depositing relatively large quantities of various sanitizing chemical products into the water. The disadvantages of these traditional sanitizing methods include recurring and high chemical costs, along with non-uniform efficacy due to concentration spikes upon application, the concentration of which typically wanes over time and according to bioload. Yet additionally, use of such chemical products bring requirements for procedural, equipment, and other safeguards addressing the safety, storage, and handling of these chemicals.

Other systems operate upon principles of electrolytic dissociation of chlorine from a sodium chloride (saline) solution. Such dissociation results in the desirable formation of bioactive residual chlorine and sodium hypochlorite; however, as is inherent to such systems, the resulting sodium hypochlorite solution contains a high residual salt concentration. Many such systems utilize holding tanks, wherein the resulting sodium hypochlorite and saline solution is stored pending release into a body of water, such as a swimming pool or spa. When the sodium hypochlorite and saline solution is released periodically into the body of water, the sodium hypochlorite is thereafter consumed. Disadvantageously, however, the salt concentration in the body of water continues to increase, along with other dissolved solids typically present in such bodies of water, so that the total dissolved solids in the water become excessive. Under such circumstances, the operator must backwash the body of water (e.g., the operator must drain and replace some water in the pool or spa) in order to decrease the total dissolved solids. This backwashing operation is both wasteful and ecologically unfriendly, if not outright destructive, due to the high saline concentrations often present in the discharged water.

Thus, it is clear that there is an unmet need for a system and method for chlorine generation and distribution that reduces the nature and amounts of chemical materials that are necessary for operation, that allows large doses of bio-active agent to be supplied for rapid buildup of concentration of the bio-active agent in the body of water, on the one hand, and that further allows lesser doses of bio-active agent to be supplied for maintenance of concentration of the bio-active agent in the body of water, on the other hand, all in association with a method that is safer and more cost effective in operation.

SUMMARY

Briefly described, in a preferred embodiment, the system and method of the present disclosure overcome the above-mentioned disadvantages and meet the recognized need for such a system and method by providing a production unit for electrolytic production of chlorine from a sodium chloride salt solution, a salt tank for maintaining the salt solution, and a distribution and control system for selective distribution of the chlorine product, and which provides for selective production of chlorine and for safety control.

According to its major aspects, and broadly stated, an exemplary system according to the present disclosure comprises a system including a production tank having an electrolytic cell operable to produce a chlorine product from a sodium chloride salt solution and a distribution system to distribute the product to the body of water. The production tank preferably includes a vertically-oriented electrolytic cell disposed within a reaction chamber. A salt solution is preferably circulated through the reaction chamber from the bottom and overflows the top into the production tank. The salt solution is preferably selectively converted into a chlorine product via electrolysis by the electrolytic cell. During operation, a concentration of chlorine in the production tank increases. It is noted that a plurality of criteria determines the chlorine concentration in the production tank, including the concentration of sodium chloride salt in the tank, and the water flow into and from the tank.

A conductivity sensor, or other sensor adapted to detect salt concentration, preferably controls a pump operable to supply saturated or nearly-saturated salt solution to the production tank in order to maintain salt concentration therein at or near a predetermined value, or within a predetermined range of values, as desired and as further described hereinbelow.

In the preferred embodiment of the present invention, in order to further control salt concentration within the production tank, water is pumped, drawn, or otherwise circulated from the body of water and is directed into the chlorine production tank. The saturated, or nearly saturated, salt solution is thereby diluted with water from the body of water, so that the predetermined salt concentration value, or range of values, may be effectively maintained by operation of the aforementioned conductivity or other sensor. So long as a sufficiently high concentration of salt is present in the production tank to maintain chlorine production, no additional salt need be added. If, however, the salt concentration in the production tank drops below, for example, a threshold value, the conductivity or other sensor in turn activates the pump to introduce sufficient and additional salt into the production tank to enable and maintain chlorine production.

Accordingly, and uniquely advantageous to the present invention, the body of water can thereby be maintained in approximate steady state equilibrium with regard to salinity and chlorine concentration, because salt in the body of water is constantly consumed within the chlorine production tank. Thus, additional salt need not be added to the production tank until the salt concentration within the overall body of water falls below a predetermined value or range of values.

Since no salt is added directly to the body of water, as is the case in prior art systems, and since the overall salt concentration within the system and, thereby, within the body of water, is maintained at an approximate steady state equilibrium value according to operation of the present invention, the present invention advantageously avoids the aforementioned detrimental effects of excessive salt and, thereby, excessive total dissolved solids within the body of water. The present invention further advantageously enables an operator to avoid the wasteful and ecologically unfriendly, if not outright destructive, practice of backwashing the body of water in order to reduce salt and/or total dissolved solids concentrations within the body of water.

The system may further include a heat exchanger or chiller operable to maintain the temperature of the solution within the production tank at or near a predetermined temperature value, or within a range of predetermined temperature values, as desired.

The system may further include a pH control system operable to maintain the pH of the solution within the production tank at or near a predetermined pH value, or within a range of predetermined pH values, as desired.

As described herein, the chlorine product is preferably distributed to the body of water, such as may be contained within a pool, spa, potable water supply, food processing tank, cleaning tank, sanitization tank, or the like, to maintain a concentration of chlorine in the body of water at or near a predetermined value, or within a predetermined range of values. In alternative embodiments, such distribution of the chlorine product may be performed according to a time schedule based upon a rate of chlorine loss in the body of water, or in response to a measured concentration of chlorine product in the body of water, or according to other operator-defined and relevant criteria, in order to maintain the chlorine product concentration within the body of water at or near a predetermined value, or within a predetermined range of values.

Accordingly, one feature and advantage of the system and method of the present invention is the ability to produce and maintain a solution having a predetermined concentration of chlorine product for selective distribution to a body of water.

Another feature and advantage of the system and method of the present invention is that, in one mode of operation, the body of water can be maintained in approximate steady state equilibrium with regard to salinity and chlorine concentration.

Another and further feature and advantage of the system and method of the present invention is that, in one mode of operation, since no salt is added directly to the body of water, as is the case in prior art systems, and since the overall salt concentration within the system and, thereby, within the body of water, is maintained at an approximate steady state equilibrium value according to operation of the present invention, the present invention advantageously avoids the aforementioned detrimental effects of excessive salt and, thereby, excessive total dissolved solids within the body of water.

Another and still further feature and advantage of the system and method of the present invention is that the present invention further advantageously enables an operator to minimize or avoid the wasteful and ecologically unfriendly, if not outright destructive, practice of backwashing the body of water in order to reduce salt and/or total dissolved solids concentrations within the body of water.

Another feature and yet still further advantage of the system and method of the present invention is that, in another mode of operation, the body of water can be treated with a relatively larger quantity of chlorine in order to "shock" the bioactive elements within the body of water for more immediate cleansing effect.

These and other features and advantages of the system and method of the present invention will become apparent to those ordinarily skilled in the art after reading the following Detailed Description of the Invention and Claims in light of the accompanying drawing Figures.

BRIEF DESCRIPTION OF THE DRAWINGS

Accordingly, the system and method of the present invention will be understood best through consideration of, and with reference to, the following drawings, viewed in conjunction with the Detailed Description of the Invention referring thereto, in which like reference numbers throughout the various drawings designate like structure, and in which.

Figure 1:
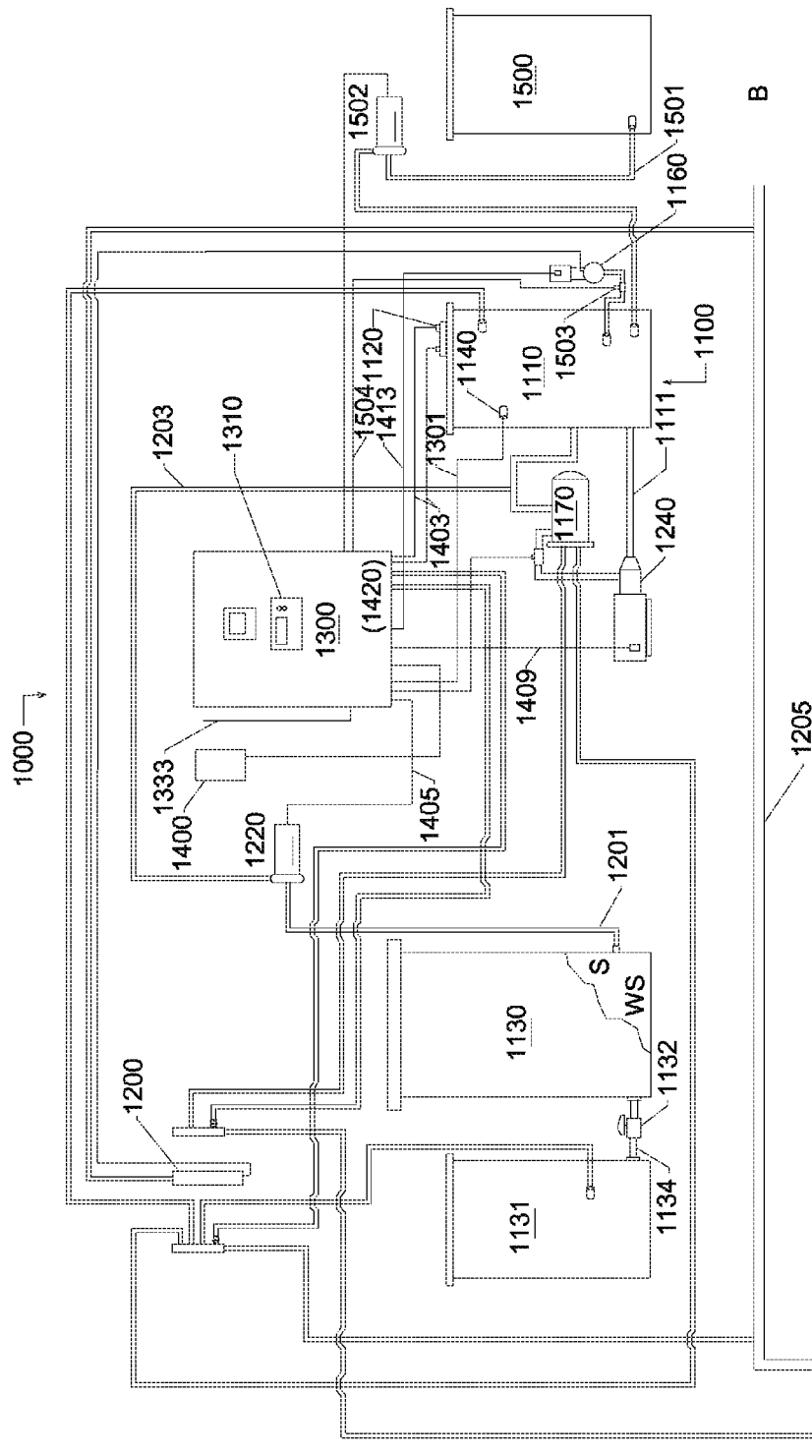
FIG. 1 is a diagram of an exemplary system according to the present invention.

It is to be noted that the drawing Figures presented are intended solely for the purpose of illustration and that they are, therefore, neither desired nor intended to limit the claimed invention to any or all of the exact details of construction shown, except insofar as they may be deemed essential to the claimed invention.

DETAILED DESCRIPTION OF ILLUSTRATIVE EMBODIMENTS

In describing preferred embodiments of the system and method of the present disclosure illustrated in the drawing Figures, specific terminology is employed for the sake of clarity. The claimed invention, however, is not intended to be limited to the specific terminology so selected, and it is to be understood that each specific element includes all technical equivalents that operate in a similar manner to accomplish a similar purpose.

It will be further understood that the term, "body of water," as used herein, is intended to describe any of a variety of those bodies of water, and any and all specific bodies of water, that, in association with, or by operation of, the present invention, may be sanitized for use in association with human consumption or recreational activities. The term is intended to apply, by way of non-limiting example, to bodies of water such as swimming pools, spas, and the like; to potable water storage and supply systems; to food processing and cleaning systems; to food handling equipment and systems; and the like, wherein the water may be sanitized in association with, or by operation of, the present invention, to prevent the accumulation of algae and bacteria, the transfer of disease, or the like.

In that form of the preferred embodiment of the system and method of the present disclosure chosen for purposes of illustration, FIG. 1 shows system 1000 including production unit 1100, distribution unit 1200, control unit 1300, and power unit 1400, operable to treat pool, spa, or other body of water B. Specifically, production unit 1100 is preferably operable to generate a bio-active agent, such as chlorine, for use in treatment of a body of water B in accordance with one or more control signal provided by control unit 1300. Distribution unit 1200 is preferably operable to selectively dose the bio-active agent generated by production unit 1100 to body of water B, similarly in response to one or more control signal provided by control unit 1300, such as a signal based on a timer, a sensor output, or the like. Power unit 1400 is preferably operable to supply electrical power to production unit 1100, and is preferably operable with electric service from control unit 1300. Specifically, salinity controller is preferably powered via control unit 1300, electrolytic cell 1120 is preferably powered via power line 1403, salt solution pump 1220 is preferably powered via power line 1405, re-circulation pump 1240 is preferably powered via power line 1409, and dosing pump 1160 is preferably powered via power line 1413.

Production unit 1100 preferably includes production tank 1110 in which a bio-active agent product, such as sodium hypochlorite, is produced and stored and in which electrolytic cell 1120 is disposed for electrolytic generation of the bio-active agent. Production unit 1100 preferably further includes salt solution supply tank 1130 adapted to supply salt solution, such as a saturated sodium chloride salt solution, to production tank 1110 via conduit 1201, pump 1220, and conduit 1203. Pump 1220 is preferably controlled to maintain, in an exemplary system, a salt solution within production tank 1110 of approximately 5000 parts per million ("ppm") by salinity controller 1310 operable with salinity detector 1140. Salinity controller 1310 preferably receives a signal from salinity detector 1140 corresponding to a salt concentration of solution in production tank 1110 via connector 1301 and activates pump 1220 when the salinity in production tank 1110 falls below a predetermined threshold via a signal transmitted over connector 1301. For example, salinity controller 1310 may activate pump 1220 for a predetermined period of time when the salinity within production tank 1110 falls below a predetermined set point. Pump 1220 preferably draws saturated salt solution from salt solution supply tank 1130 via conduit 1201 and supplies the saturated salt solution to production tank 1110 via conduit 1201.

Salt solution supply tank 1130 may contain a selected amount of salt, and is preferably maintained at or near capacity with salt, whereby addition of salt thereto may be avoided for extended periods of time, if necessary or desired. Only a relatively small amount of water, however, is maintained in salt solution supply tank 1130, whereby the majority of the salt contained therein may remain dry. Float tank 1131 is preferably disposed in fluid communication with salt solution supply tank 1130 via conduit 1134, wherein water may flow freely therebetween. Thus, float tank 1131 preferably controls a level of water in both float tank 1131 and in salt solution supply tank 1130, such as via ball valve 1132, or the like. Accordingly, when saturated salt solution is drawn from salt solution supply tank 1130, water may automatically be introduced into float tank 1131 to replace the removed salt solution; thereby, maintaining a substantially constant water level within salt solution supply tank 1130. Excess salt stored in salt solution supply tank 1130 may then be dissolved to saturate the water in salt solution supply tank 1130.

In operation, electrolytic cell 1120 is preferably supplied with salt solution from production tank 1110 via re-circulation pump 1240 and plumbing 1111, whereby an electric potential maintained across electrodes of electrolytic cell 1120 by power line 1403 converts a portion of the salt to sodium hypochlorite. At least during production, recirculation of the brine is preferably continuous, whereby generated sodium hypochlorite overflows the electrolytic cell and collects in production tank 1110 for subsequent distribution to body of water B. Electrolytic cell 1120 is preferably operated at a rate and for a duration sufficient to allow sodium hypochlorite to accumulate within production tank 1110 to a desired concentration.

It is noted that the sodium hypochlorite in production tank 1110 will have a pH value in excess of 9.0. In accordance with the present state-of-the-art, it is the industry practice to control this pH in the swimming pool through the addition of muriatic acid or carbon dioxide into the return line of the pool. When correctly done, this has the effect of lowering the pH of the pool water to approximately 7.2-7.5, which, in turn, makes the chlorine in the pool water more active and releases more hypochlorous acid.

In accordance with the present inventive subject matter, and as best seen with reference to FIG. 1, an integral pH control system may be added. Uniquely and advantageously, such a pH control system allows adjustment and modification of pH to be effectuated during production of chlorine in production tank 1110. This is accomplished by adding tank 1500 containing a dilute concentration of muriatic acid, fed via line 1501 through pump 1502 into the bottom of production tank 1110 and through electrolytic cell 1120. Pump 1502 is powered by control unit 1300. Thus, the pH of the chlorine produced in tank 1110 can be maintained at any required measurement set point by pH probe 1503 located in the circulation system. pH probe 1503 is controlled via line 1504 to control unit 1300.

In order to treat body of water B, chlorine, or other bio-active agent, may be distributed from production tank 1110 to body of water B via conduit 1205. In order to control such distribution, such as to maintain a safe and effective concentration of chlorine in body of water B, conduit 1205 may carry chlorine, or other bio-active agent, to water via venturi injector, dosing pump, or similar device or method. Such distribution of chlorine, or other bio-active agent, may be controlled by any sanitizer level control system (not shown). The control signal provided by a dosing controller may be based on a timer, a signal provided by chlorine detector via connector 1333 corresponding to a level of chlorine concentration in body of water B, or the like. If operated according to a timer, the dosing cycle, i.e. the time for which control unit 1300 is operated and the time between such operations, is preferably selected according to a rate of loss of chlorine, or other bio-active agent, from body of water B. Thus, as a value of concentration of chlorine, or other bio-active agent, within body of water B may preferably be maintained at or near a predetermined level, or within a predetermined range of values. System 1000 may also operate on a continuous basis if desired, at a predetermined production and operational rate.

As will be understood by those ordinarily skilled in the art, such electrolytic production of sodium hypochlorite generates heat, which is preferably controlled to prevent the temperature of the water within production tank 1110 from exceeding a predetermined threshold. Preferably, relatively cool water, such as water drawn from body of water B, is supplied to heat exchanger or chiller 1170. Such relatively cool water preferably returns to conduit 1205 for return to body of water B. Similarly, rectifier 1420 of power unit 1400 may be cooled by water, such as water re-circulated by pump 1160, as desired. Preferably, water drawn from body of water B is circulated through chiller 1170 and/or a housing of rectifier 1420 continuously; thereby, avoiding the need for associated control systems and maintenance thereof. Alternatively, however, circulation of water from body of water B, or from another source, may be selectively controlled via valves, or the like, to provide cooling on demand.

Figure 2:
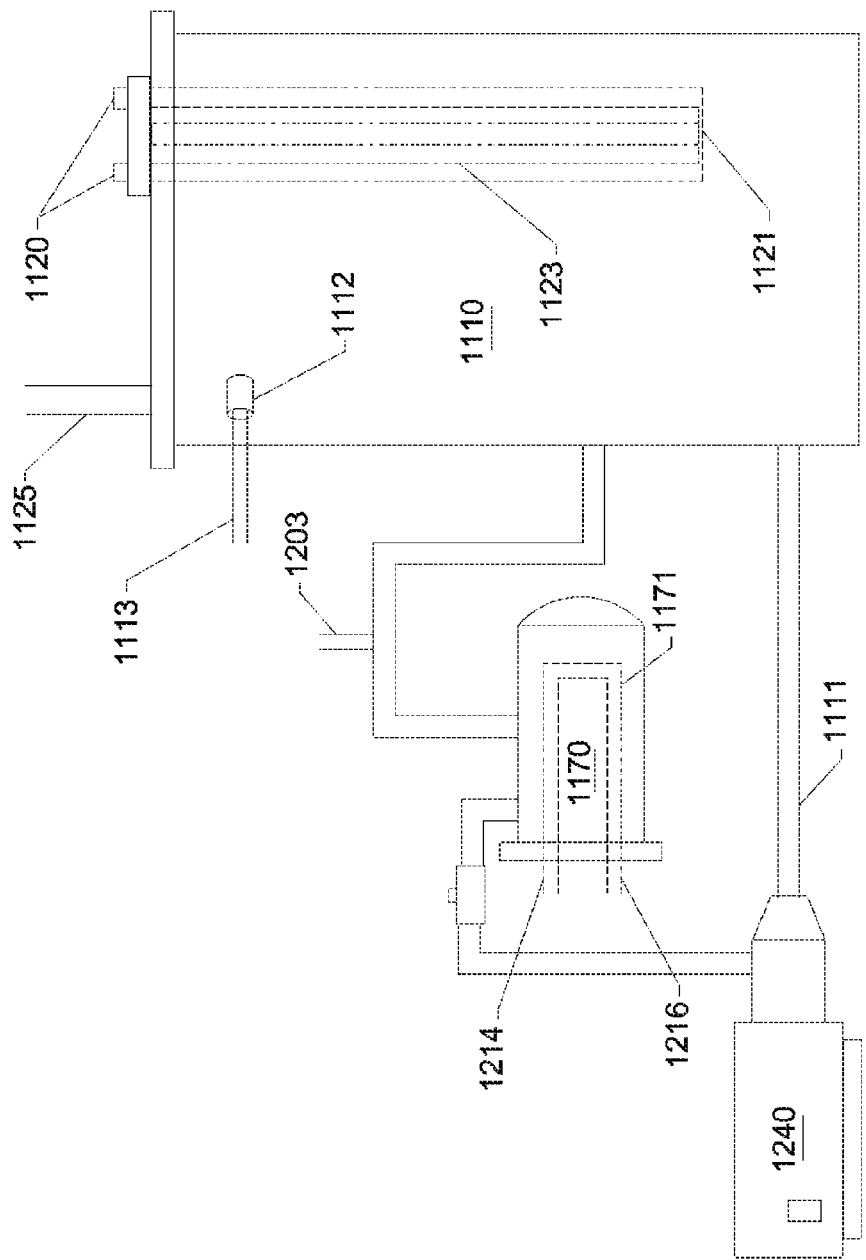
FIG. 2 is a diagram of a portion of a preferred embodiment of the system of FIG. 1.

With continuing reference to FIG. 1, and turning additionally now to FIG. 2, a preferred embodiment of system 1000 is illustrated. The preferred system is adapted to generate chlorine for use in treating any body of water B. Specifically, production tank 1110 is preferably formed as a sealed tank selected from a corrosion-resistant material, such as a plastic material. Tube 1121, preferably formed of polyvinylchloride ("PVC"), is preferably generally vertically mounted within production tank 1110 and is preferably in fluid communication with an outlet of chiller 1170, whereby fluid pumped through chiller 1170 only enters tube 1121. Stack 1123 of electrode plates is preferably mounted within tube 1121 whereby fluid entering tube 1121 proximate a bottom end thereof must flow past and through stack 1123 and whereby reacted fluid, i.e. sodium hypochlorite, will overflow tube 1121 and collect in production tank 1110. As discussed above, a salt solution is circulated from production tank 1110 through chiller 1170 and tube 1123 during electrolytic production of sodium hypochlorite by pump 1240 and conduits 1111. Such electrolytic production produces hydrogen gas as a byproduct, which may be removed via vent pipe 1125. Additionally, production tank 1110 preferably further includes ball valve 1112 operable to maintain a desired level of solution within production tank 1110 and is preferably operable with conduit 1113 to supply water from body of water B, as necessary.

Chiller 1170 preferably contains titanium thermal transfer unit 1171 adapted to allow transfer of thermal energy from a surrounding salt solution to water flowing therethrough from body of water B without allowing mixture of the two flows. Water from body of water B is preferably pumped through thermal transfer unit 1171 via pump 1160, conduit 1211, manifold 1218, and conduits 1214 and 1216.

Saturated salt solution Ws is preferably maintained in salt solution supply tank 1130 with a supply of salt S. Saturated salt solution Ws is preferably pumped from salt solution supply tank 1130 via salt solution pump 1220 via conduits 1201 and 1203. Conduit 1203 preferably dispenses salt solution into chiller 1170. Salt solution pump 1220 is preferably controlled by salinity controller 1310 which is preferably operable to selectively supply electric power to pump 1220 to selectively pump saturated salt solution from salt solution supply tank 1130 to chiller 1170, and thus into tube 1121 to allow production of sodium hypochlorite. The level of liquid within salt solution supply tank 1130 is preferably controlled by float tank 1131 connected to salt solution supply tank 1130 by conduit 1134. Float tank 1131 preferably includes ball valve 1132 and body of water supply line 1133 operable therewith to maintain a desired liquid level. Liquid level of tank 1110 is further controlled by, for example, a toroidal salinity probe mounted in the tank which has the ability to shut off power if the liquid level falls below a predetermined value.

In order for electrolytic cell 1120 to produce sodium hypochlorite, as discussed above, a liquid in production tank 1110 preferably contains sodium chloride salt in solution. Specifically, salinity controller 1310 receives a signal from salinity detector 1140 corresponding to a concentration of salt in the solution within production tank 1110. Salinity controller 1310 then determines whether a concentration of salt in the solution is less than a threshold value. If the concentration is less than the threshold value, salt solution pump 1220 may be activated by salinity controller 1310, such as by allowing electricity to flow to salt solution pump 1220. Salt solution pump 1220 preferably draws saturated, or nearly saturated, salt solution from salt solution supply tank 1130 and pumps the salt solution through conduit 1201 into chiller 1170. As solution is drawn from salt solution supply tank 1130, water is preferably allowed to enter float tank 1131 by ball valve 1132, due to a drop in liquid level therein. Thus, a liquid level in salt solution supply tank 1130 is preferably maintained approximately at a selected level. Additionally, excess salt S stored within salt solution supply tank 1130 is preferably dissolved to maintain a saturated or nearly saturated salt solution within salt solution supply tank 1130. Salinity controller 1310 may then receive another signal from salinity detector 1140 corresponding to a salt concentration within production tank 1110. Salinity controller 1310 may then determine whether the salt concentration is greater than a second threshold value. If the salt concentration is greater than the second threshold value, then salt solution pump 1220 may be deactivated, and salinity controller 1310 may return its operation to receive another signal corresponding to salt concentration.

As discussed above, once a predetermined concentration of chlorine has been achieved in production tank 1110, such chlorine may selectively be distributed to body of water B for treatment thereof, such as to prevent growth of unwanted bacteria, or the like. Regulation of such distribution is achieved by controlling output of chlorine, or other bioactive agent, through valve 1200 and input of salt water from salt tank 1130 through conduit 1201 and pump 1220. Regulation of these flows allows various concentrations of chlorine to be maintained in production tank 1110 based upon end user demand.

System 1000, or a selected embodiment thereof, such as the preferred embodiment of FIG. 2, optionally may include various safety devices or systems adapted to shut down system 1000, or the like, in the event of a failure of one or more components thereof. For example, salinity controller 1310 may be operable to shut down system 1000 if the salt concentration within production tank 1110 falls below a predetermined safety salinity threshold, such as 3000 ppm.

Furthermore, additional safety systems may also be included, such as a ground fault interrupt system, a system operable to shut system 1000 down in the event of a failure of a component thereof, or the like. For example, if re-circulation pump 1240 fails, and, therefore, does not flow water, system 1000 may be shut down to protect one or more components thereof. Similarly, a flow monitor may be used to detect one or more failure in system 1000, and to shut down system 1000 upon detection of such a failure.

Having thus described exemplary embodiments of the present invention, it should be noted by those skilled in the art that the within disclosures are exemplary only and that various other alternatives, adaptations, and modifications may be made within the scope and spirit of the present invention. For example, while the system of the present disclosure has been described with regard to a single electrolytic cell, a plurality of electrolytic cells may be included in order to increase a rate of production of sodium hypochlorite, or the like. Accordingly, the present invention is not limited to the specific embodiments as illustrated herein, but is only limited by the following claims.

What is claimed:

1. A system for chlorine generation and distribution to a body of water comprising:
   a. a chlorine production tank;
   b. an electrolytic cell at least partially immersed within said chlorine production tank and operable, when energized, to produce a chlorine product from a sodium chloride salt solution, said chlorine product produced and stored in situ within said chlorine production tank pending distribution to the body of water;
   c. a sensor associated with said chlorine production tank and adapted to monitor salt concentration in said production tank while said electrolytic cell is energized;
   d. a float tank operable to supply water to a salt solution supply tank, said salt solution supply tank operable to supply saturated or nearly-saturated salt solution to said production tank in order to adjust and maintain salt concentration therein at or near a predetermined value, or within a predetermined range of values, as determined by said sensor;
   e. a supply of water directed from the body of water into said production tank; and,
   f. a distribution system to distribute the chlorine product from said chlorine production tank to the body of water.

2. The system of claim 1 wherein said distribution system comprises a pump and conduit.

3. The system of claim 1 wherein said electrolytic cell comprises a plurality of electrolytic cells.

4. The system of claim 1 wherein the concentration of salt in said body of water is consumed within said production tank by operation of said electrolytic cell.

5. The system of claim 4 wherein additional salt solution is introduced into said production tank only when the salt concentration in said production tank falls below a threshold value.

6. The system of claim 1 wherein said sensor is further associated with a logic controller and pump for detection of salt concentration and subsequent supply of saturated or nearly-saturated salt solution to said production tank, in order to maintain salt concentration therein at or near a predetermined value, or within a predetermined range of values.

7. The system of claim 1, further comprising a pH control system.

8. The system of claim 7, wherein the pH control system comprises a tank containing dilute acid, means for transferring the acid into the chlorine production tank, control means for controlling the transfer of acid into the chlorine production tank, and pH sensor means cooperatively associated with the control means and the chlorine production tank.

9. The system of claim 1, further comprising a heat exchanger or chiller operable to maintain a temperature of the solution within the production tank at or near a predetermined temperature.

10. The system of claim 1 wherein the chlorine product is distributed to a body of water such as may be within a container selected from the group consisting of a pool, a spa, a potable water container, a food processing container, a cleaning container, and a sanitization container.

11. A system treating a body of water with a bioactive agent, comprising:
a. a body of water;
b. a chlorine production tank;
c. an electrolytic cell at least partially immersed within said chlorine production tank and operable, when energized, to produce a chlorine product from a sodium chloride salt solution, said chlorine product produced and stored in situ within said chlorine production tank pending distribution to the body of water;
d. a sensor associated with said chlorine production tank and adapted to monitor salt concentration in said production tank while said electrolytic cell is energized;
e. a float tank operable to supply water to a salt solution supply tank, said salt solution supply tank operable for supply of saturated or nearly-saturated salt solution to said production tank in order to adjust and maintain salt concentration therein at or near a predetermined value, or within a predetermined range of values, as determined by said sensor;
f. a supply of water directed from the body of water into said production tank; and,
g. a distribution system to return a quantity of the chlorine product from said chlorine production tank to the body of water.

12. The system of claim 11 wherein said distribution system comprises a pump and conduit.

13. The system of claim 11 wherein said electrolytic cell comprises a plurality of electrolytic cells.

14. The system of claim 11 wherein the concentration of salt in said body of water is consumed within said production tank by operation of said electrolytic cell.

15. The system of claim 14 wherein additional salt solution is introduced into said production tank only when the salt concentration in said production tank falls below a threshold value.

16. The system of claim 11 wherein said sensor is further associated with a logic controller and pump for detection of salt concentration and subsequent supply of saturated or nearly-saturated salt solution to said production tank, in order to maintain salt concentration therein at or near a predetermined value, or within a predetermined range of values.

17. The system of claim 11, further comprising a pH control system, the pH control system comprising a tank containing dilute acid, means for transferring the acid into the chlorine production tank, control means for controlling the transfer of acid into the chlorine production tank, and pH sensor means cooperatively associated with the control means and the chlorine production tank.

18. The system of claim 11, further comprising a heat exchanger or chiller operable to maintain a temperature of the solution within the production tank at or near a predetermined temperature.

19. A system for chlorine generation and distribution to a body of water comprising a chlorine production tank; an electrolytic cell at least partially immersed within said chlorine production tank and operable, when energized, to produce a chlorine product from a sodium chloride salt solution, said chlorine product produced and stored in situ within said chlorine production tank pending distribution to the body of water; a sensor associated with said chlorine production tank and adapted to detect and monitor salt concentration in said production tank while said electrolytic cell is energized; a float tank operable to supply water to a salt solution supply tank, said salt solution supply tank operable for supply of saturated or nearly-saturated salt solution to said production tank in order to adjust and maintain salt concentration therein at or near a predetermined value, or within a predetermined range of values, as determined by said sensor; a supply of water directed from the body of water into said production tank and into said float tank; a pH control system, the pH control system comprising a tank containing dilute muriatic acid, means for transferring the muriatic acid into the chlorine production tank, control means for controlling the transfer of muriatic acid into the chlorine production tank, and pH sensor means cooperatively associated with the control means and the chlorine production tank; and, a distribution system to distribute the chlorine product from said chlorine production tank to the body of water.

20. The system of claim 19 further comprising a heat exchanger or chiller operable to maintain a temperature of the solution within the production tank at or near a predetermined temperature.

* * * * *